(12) United States Patent
Nishio et al.

(10) Patent No.: US 6,707,640 B2
(45) Date of Patent: Mar. 16, 2004

(54) ROTARY MEDIUM DRIVING APPARATUS

(75) Inventors: Akira Nishio, Kawasaki (JP);
Tomoyuki Tashiro, Fujieda (JP)

(73) Assignee: JVC Victor Company of Japan, Ltd., Kanagawa-Ken (JP)

( * ) Notice: Subject to any disclaimer, the term of this patent is extended or adjusted under 35 U.S.C. 154(b) by 18 days.

(21) Appl. No.: 09/753,866

(22) Filed: Jan. 4, 2001

(65) Prior Publication Data

US 2001/0007519 A1 Jul. 12, 2001

(30) Foreign Application Priority Data

Jan. 7, 2000 (JP) ....................................... 2000-001391
Jun. 30, 2000 (JP) ....................................... 2000-198370
Aug. 30, 2000 (JP) ....................................... 2000-260484

(51) Int. Cl.[7] .............................................. G11B 17/02
(52) U.S. Cl. .................................................... 360/99.08
(58) Field of Search ............................ 360/99.08, 99.06, 360/99.05, 99.07

(56) References Cited

U.S. PATENT DOCUMENTS

| | | | | | |
|---|---|---|---|---|---|
| 5,394,283 A | * | 2/1995 | Hans et al. | ............... | 360/98.07 |
| 5,471,357 A | * | 11/1995 | Ishizuka | .................... | 360/99.08 |
| 5,483,113 A | * | 1/1996 | Sakuragi et al. | ........... | 310/67 R |
| 5,850,318 A | * | 12/1998 | Dunfield et al. | .......... | 360/99.08 |
| 5,903,408 A | * | 5/1999 | Omi | ......................... | 360/73.03 |
| 6,028,738 A | * | 2/2000 | Konno et al. | ............. | 360/99.08 |
| 6,052,257 A | * | 4/2000 | Branger et al. | ........... | 360/99.08 |
| 6,078,466 A | * | 6/2000 | Obara | ...................... | 360/99.08 |
| 6,084,323 A | * | 7/2000 | Pelstring et al. | ........ | 310/156.12 |
| 6,181,513 B1 | * | 1/2001 | Obara | ...................... | 360/99.08 |
| 6,185,067 B1 | * | 2/2001 | Chamberlain | ............ | 360/99.08 |
| 6,188,155 B1 | * | 2/2001 | Ishizuka et al. | .............. | 310/43 |
| 6,316,853 B1 | * | 11/2001 | MacLeod | ............... | 310/156.05 |

* cited by examiner

Primary Examiner—Robert S. Tupper
(74) Attorney, Agent, or Firm—Anderson Kill & Olick, P.C.; Eugene Lieberstein; Michael N. Meller

(57) ABSTRACT

In the rotary medium driving apparatus 1 equipped with the rotor 3, which can rotate freely around the shaft 18 fixed to the stator 4 by means of the ball bearings 16 and 17 and is provided with a certain diameter being capable of fitting a center hole of a rotary medium, the stator 4 is composed of the flat base 2 formed by a presswork and the stator core 15. The base 2 holds the shaft 18, which is inserted into the inner circumference surface 52 of the base 2, and has the ring shaped projection 5 for allocating the stator core 15 on the outer circumference surface 51 of the base 2.

8 Claims, 12 Drawing Sheets

ROTARY MEDIUM DRIVING APPARATUS

BACKGROUND OF THE INVENTION

1. Field of the Invention

The present invention relates to a rotary medium driving apparatus, which is installed in a driving apparatus such as a hard disk drive (HDD) and drives a rotary recording medium.

2. Description of the Related Art

FIG. 7 is a magnetic disk driving apparatus of the prior art. In FIG. 7, the magnetic disk driving apparatus 901 of the prior art is constituted of a rotor 903, which is supported by a shaft 918 fastened to a stator 904 with rotating freely by way of upper and lower ball bearings 916 and 917. Further, the rotor 903 is provided with an outer cylindrical surface 911a of which diameter is assigned so as to fit to a center hole of a magnetic disk (not shown) to be rotated.

In other words, the magnetic disk driving apparatus 901, which is allocated within a cleansed space of a hard disk drive (HDD), comprises a hub 911 of which an outer circumference area is provided with the outer cylindrical surface 911a and a seating surface 911b for mounting at least one magnetic disk so as to fasten the disk securely.

Furthermore, the magnetic disk driving apparatus 901 comprises the rotor 903 including a magnet 912, a rotor yoke 913, and the hub 911 and the stator 904 including a coil 914 for driving the rotor 903 and a stator core 915.

Inner wheels of the upper and lower ball bearings 916 and 917 are fixed to the shaft 918 by press fitting or gluing, while outer wheels of the upper and lower ball bearings 916 and 917 are fixed to the hub 911. The rotor 903 is supported by the shaft 918 with rotating freely by means of the upper and lower ball bearings 916 and 917.

The stator 904 is composed of a housing 902 formed by the aluminum die casting method as a main component of the stator 904. The stator core 915 wounded up with the coil 914 is allocated on an outer circumference of a projection, which is formed on a surface being perpendicular to the shaft 918 and faces toward the rotor 903. The shaft 918 is fixed in a through hole provided at a center of the housing 902.

The housing 902 mentioned above is finished by a machinery cuts so as for the outer circumference surface of the projection for installing the stator core 915 and an inner surface of the through hole for fixing the shaft 918 to become concentric circles after the housing 902 is formed by the aluminum die casting method. Concentric degree of the stator core 915 and the shaft 918 is improved by the machinery cuts mentioned above. Accordingly, the magnetic disk driving apparatus 901 can maintain a rotation performance in high accuracy.

As mentioned above, the housing 902 is finished by the machinery cuts so as for the projection for the stator core 915 and the through hole for the shaft 918 to become the concentric circles.

However, a member formed by the aluminum die casting method further requires to be processed by the machinery cuts. The machinery cuts is high in process cost. Further, cutting oil utilized for machinery cuts and cleaning liquid remains inside porous on a surface on the member processed by the machinery cuts as residues. These residues evaporate after the magnetic disk driving apparatus is installed in an HDD and cause a problem such as a head crush by hydrocarbon, which is an ingredient of cutting oil and evaporated from the residues, absorbed by a head of the HDD and a magnetic disk loaded in the HDD.

In addition thereto, if sulfur contained in cutting oil as additive evaporates or chlorine contained in chloric cleaning liquid evaporates, a surface of a disk is corroded. Accordingly, another problem occurs such that data recorded in the disk disappear or are erased.

SUMMARY OF THE INVENTION

Accordingly, in consideration of the above-mentioned problems of the prior art, an object of the present invention is to provide a rotary medium driving apparatus in high reliability, which comprises a flat base or a flat housing formed by a presswork. Further, the rotary medium driving apparatus can eliminate a problem of deteriorating reliability caused by chemicals, which stick on a head or a disk, evaporated from residues and cutting oil utilized while processing a stator housing by a machinery cuts.

In order to achieve the above object, the present invention provides, according to an aspect thereof, a rotary medium driving apparatus comprising a rotor of being able to rotate freely around a shaft fixed to a stator by means of ball bearings and being provided with an outer circumference surface having a diameter of being able to engage with a center hole of a rotary medium to be rotated, the rotary medium driving apparatus is further characterized in that the stator comprises a flat housing formed by a presswork and a stator core allocated in a vicinity of center of the flat housing, and that the flat housing fixes the shaft.

According to another aspect of the present invention, there provided a rotary medium driving apparatus comprising a rotor of being able to rotate freely around a shaft fixed to a stator by means of ball bearings and being provided with an outer circumference surface having a diameter of being able to engage with a center hole of a rotary medium to be rotated, the rotary medium driving apparatus is further characterized in that the stator comprises a flat housing formed by a presswork and a stator core allocated in a vicinity of center of the flat housing, and that the flat housing is provided with a ring shaped projection section projected toward the rotor with the shaft fixed on an inner circumference surface of the ring shaped projection section and with the stator core allocated on an outer circumference surface of the ring shaped projection section.

Other object and further features of the present invention will be apparent from the following detailed description when read in conjunction with the accompanying drawings.

DETAILED DESCRIPTION OF THE PREFERRED EMBODIMENTS

First Embodiment

Figure 1:
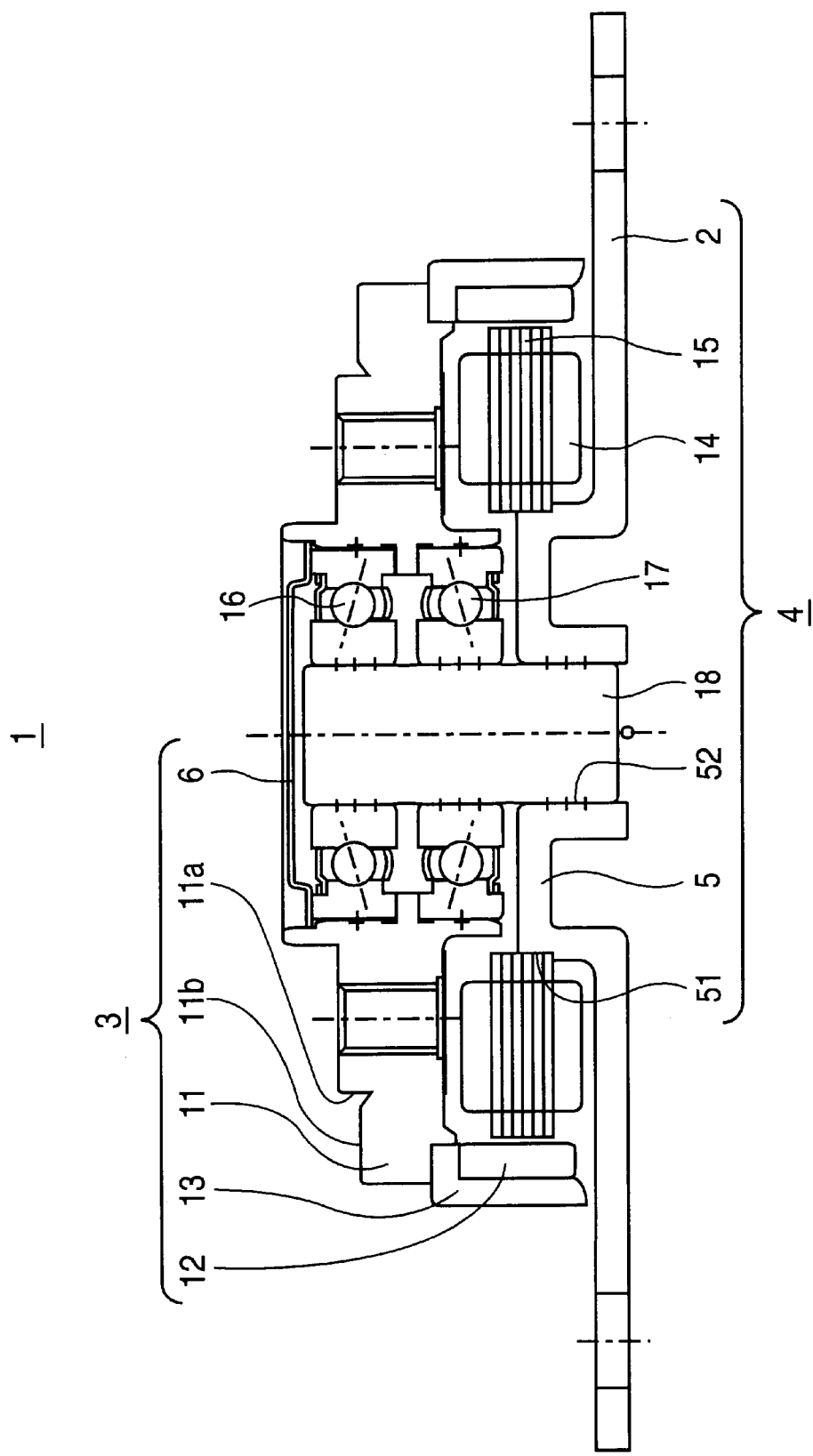
FIG. 1 is a cross sectional view of a rotary medium driving apparatus according to a first embodiment of the present invention.

FIG. 1 is a cross sectional view of a rotary medium driving apparatus according to a first embodiment of the present invention. In FIG. 1, a rotary medium driving apparatus 1 comprises a rotor 3, which includes a hub 11, a magnet 12 and a rotor yoke 13, and a stator 4, which includes a housing (base) 2, a coil 14, a stator core 15 and a shaft 18. The rotor 3 is allocated so as to rotate freely around the shaft 18 by means of upper and lower ball bearings 16 and 17. The hub 11 is further provided with an outer cylindrical surface 11a and a seating surface 11b for loading a rotary medium such as a magnetic disk in place and a cap 6 covering the upper ball bearings 16.

Further, the rotary medium driving apparatus 1 is characterized in that the base 2 is formed in one piece by a presswork and not finished by a process of machinery cuts, and that a ring shaped projection 5 is formed at a middle of the base 2 by the presswork with facing toward the rotor 3, wherein the projection 5 is provided with an outer circumference surface 51 and an inner circumference surface 52 concentrically.

A material of the base 2 is a metal plate such as aluminum, stainless steel, or iron. In a case of iron, the base 2 can be plated by nickel, zinc, or chromium after the presswork.

Accordingly, a machinery cuts is not necessary for the rotary medium driving apparatus 1 to produce the base 2, so that a less expensive housing can be provided.

Although the housing 902 of the prior art contains porous accompanied by a machinery cuts as mentioned previously, the base 2 does not contain any porous, so that a problem such that residues caused by cutting oil or cleaning liquid remaining in porous evaporate and stick on a head or a disk and cause head crush or data erasing does not occur.

Accordingly, a rotary medium driving apparatus in high reliability can be provided.

In addition thereto, the ring shaped projection 5 having the outer and inner circumference surfaces 51 and 52 is formed in one piece with the base 2 by the presswork. The outer circumference surface 51 is provided for fastening the stator core 15 and the inner circumference surface 52 is provided for fixing the shaft 18.

The stator 4 can be manufactured with maintaining a concentric degree between the stator core 15 and the shaft 18 in high accuracy by means of maintaining a concentric degree of the outer and inner circumference surfaces 51 and 52 in high accuracy by producing a die for press working the base 2 in high accuracy. Accordingly, performance and productivity of the rotary medium driving apparatus 1 can be improved.

The cap 6 is glued on a top of the hub 11 above the upper ball bearings 16. Glue is applied between an outer circumference area of the cap 6 and an inner circumference area of the hub 11 for sealing an inside of the hub 11, so that a head and a disk can be protected from absorbing evaporated oil contained in the upper and lower ball bearings 16 and 17 by air flow and causing head crush, wherein a vertical direction of each component follows the rotary medium driving apparatus 1 shown in FIG. 1.

Second Embodiment

Figure 2:
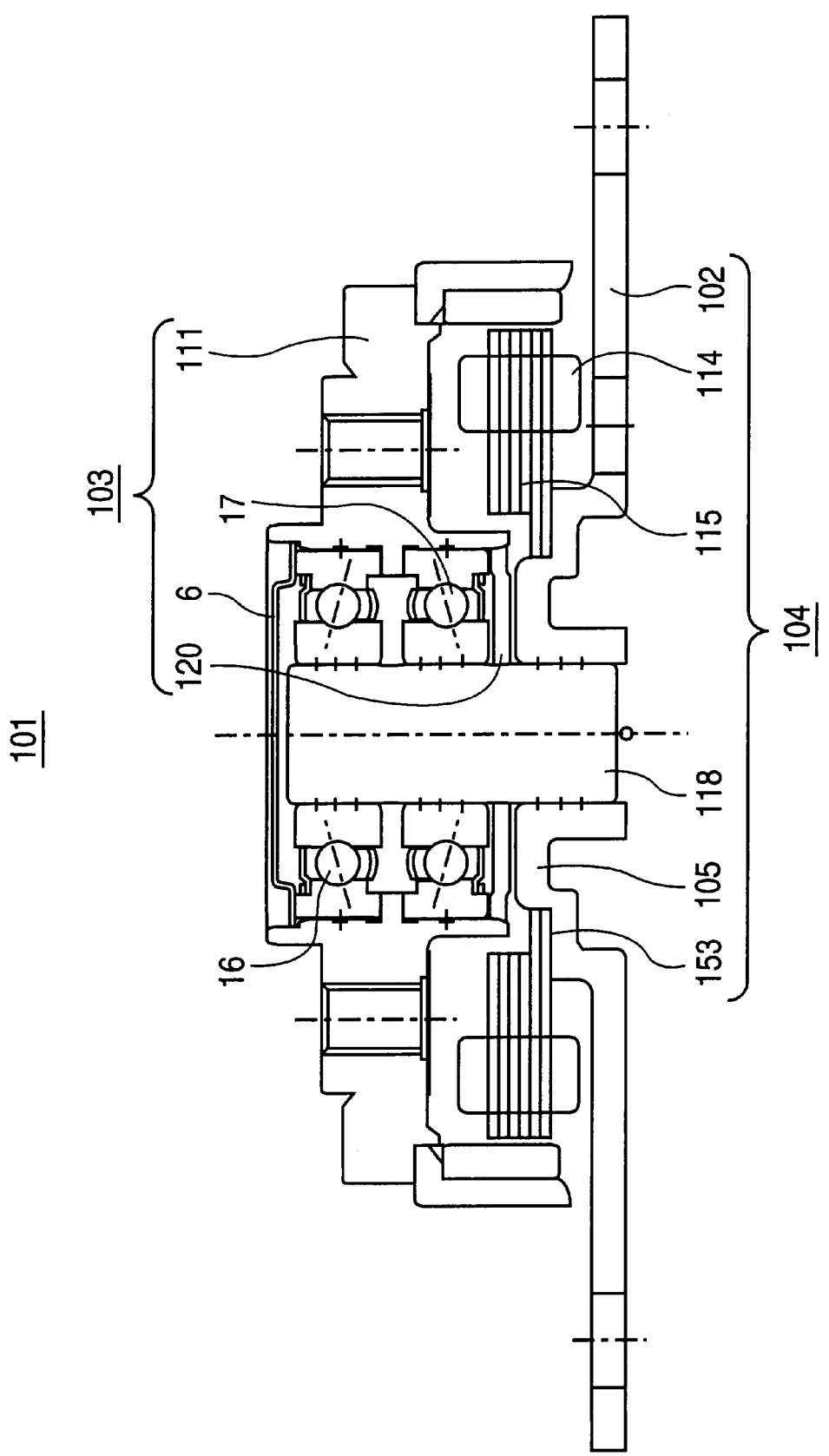
FIG. 2 is a cross sectional view of a rotary medium driving apparatus according to a second embodiment of the present invention.

FIG. 2 is a cross sectional view of a rotary medium driving apparatus according to a second embodiment of the present invention. In FIG. 2, a rotary medium driving apparatus 101 comprises a rotor 103 and a stator 104, which includes a base 102, a coil 114, a stator core 115 and a shaft 118. The rotor 103 is allocated so as to rotate freely around the shaft 18 by means of upper and lower ball bearings 16 and 17. As shown in FIG. 2, a ring shaped projection 105 is formed at a middle of the base 102 with facing toward the rotor 103. The projection 105 is further provided with a stepped section 153 on an outer circumference area of the projection 105. The stator core 115 is equipped with a smaller diameter section and a lager diameter section in an inner circumference area. A bottom of the stator core 115 is fixed on a top surface of the stepped section 153 with glue or by caulking.

Furthermore, with being allocated below the lower ball bearings 17, a ring shaped bearing seal 120 made by stainless steel (SUS) is inserted into an inner circumference area of the hub 111 and fixed.

Moreover, a cap 6 is glued on a top of the hub 111 above the upper ball bearings 16. Glue is applied between an outer circumference area of the cap 6 and an inner circumference area of the hub 111 for sealing an inside of the hub 111, so that a head and a disk can be protected from absorbing evaporated oil contained in the upper and lower ball bearings 16 and 17 by air flow and causing head crush as same as the first embodiment of the present invention.

In addition thereto, the bearing seal 120 having a gap of less than 0.5 mm between the shaft 18 and an inner circumference edge of the bearing seal 120 is installed under the lower ball bearings 17 and effectively prevents evaporated oil from scattering over a disk area.

By installing the cap 6 on the top and the bearing seal 120 on the bottom as mentioned above, excellent sealing effect can be obtained.

In the prior art, a rubber seal having excellent sealing effect is installed in the upper and lower ball bearings 16 and 17. However, in this second embodiment, the bearing seal 120 is installed. Although sealing effect of the bearing seal 120 is lower than that of the rubber seal, a less expensive metal seal made by SUS can minimize dust caused by evaporated oil.

It is important for a rotary medium driving apparatus such as a magnetic disk drive to be constituted such that a resonant frequency of the driving apparatus when a magnetic disk is loaded must not overlap with a vibration component inherent to the upper and lower ball bearings 16 and 17.

In a case that a resonant frequency of the driving apparatus overlaps with a vibration component of the upper and lower ball bearings 16 and 17, the driving apparatus is usually constituted with adjusting a span of the shaft 118, that is, a distance between the upper ball bearings 16 and the lower ball bearings 17 or a quantity of balls contained in the ball bearings 16 and 17.

In the case of the second embodiment of the present invention, the stator core 115 having smaller and larger diameter sections is mounted on the top surface of the stepped section 153 and the outer circumference area of the ring shaped projection 105 and fixed by glue or caulking.

A sectional height of the larger diameter section of the stator core 115 can be increased without touching structural components exposing under the hub 111, so that a number of sheet materials constituting the stator core 115 can be adjusted, at a same time, a height of the ring shaped projection 105 above the bottom of the base 102 can be adjusted for obtaining an optimum output necessary for a driving apparatus in a limited space. Accordingly, flexibility of designing a rotary medium driving apparatus can be increased.

Further, in the first and second embodiments mentioned above, the ring shaped projection 5 or 105 provided on the base 2 or 102 forms in a ring shaped hollow with viewing from the bottom of the base 2 or 102, so that the hollow can be utilized for holding a rotary medium driving apparatus while assembling the driving apparatus by inserting an assembling jig (not shown) into the hollow.

Providing the ring shaped projection 5 or 105 on the base 2 or 102 as mentioned above can facilitate holding a rotary medium driving apparatus, and further facilitate assembling the driving apparatus or a magnetic disk type memory device such as a hard disk drive (HDD).

Third Embodiment

Figure 3:
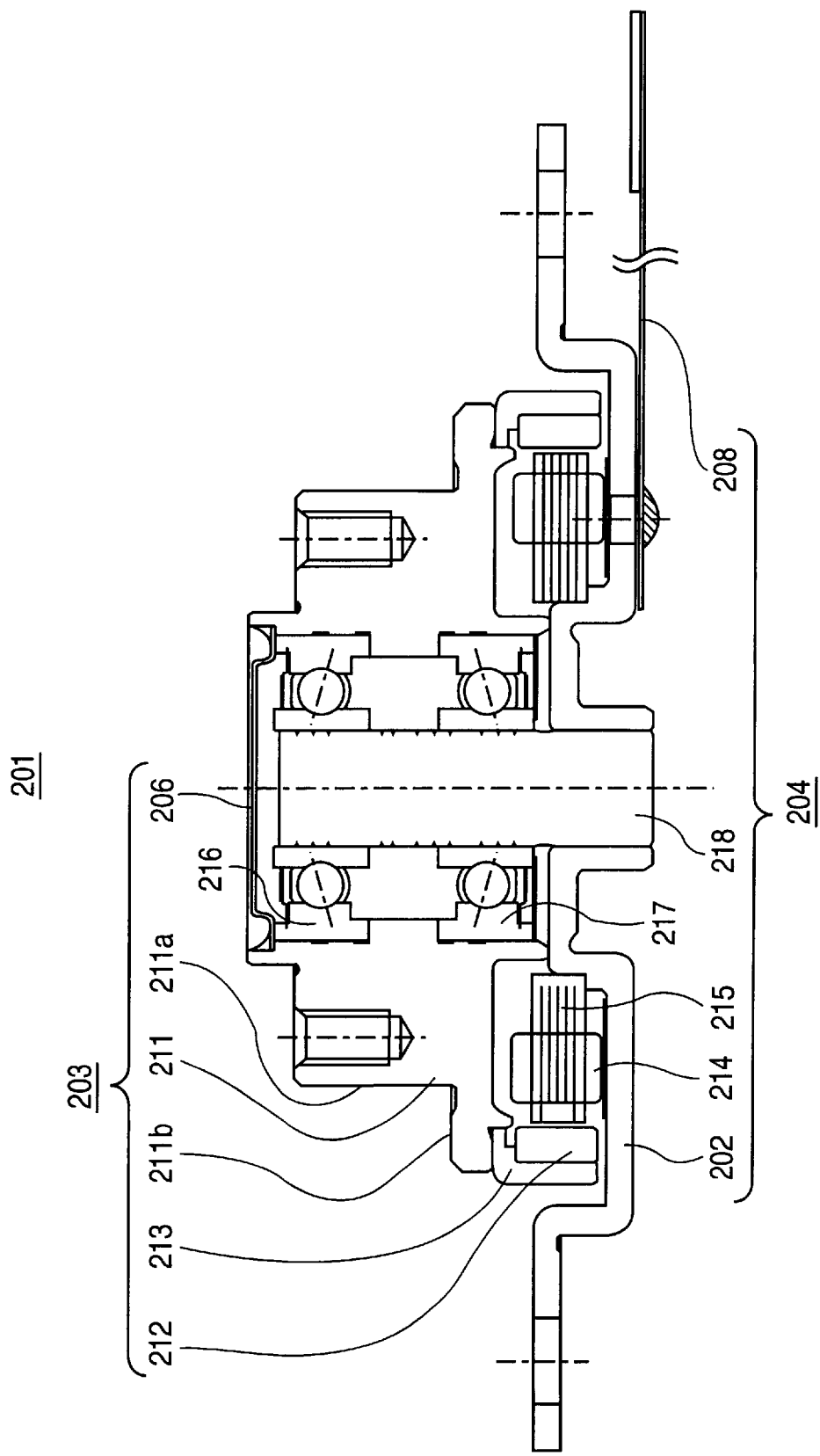
FIG. 3 is a cross sectional view of a rotary medium driving apparatus according to a third embodiment of the present invention.

FIG. 3 is a cross sectional view of a rotary medium driving apparatus according to a third embodiment of the present invention.

Figure 4A:
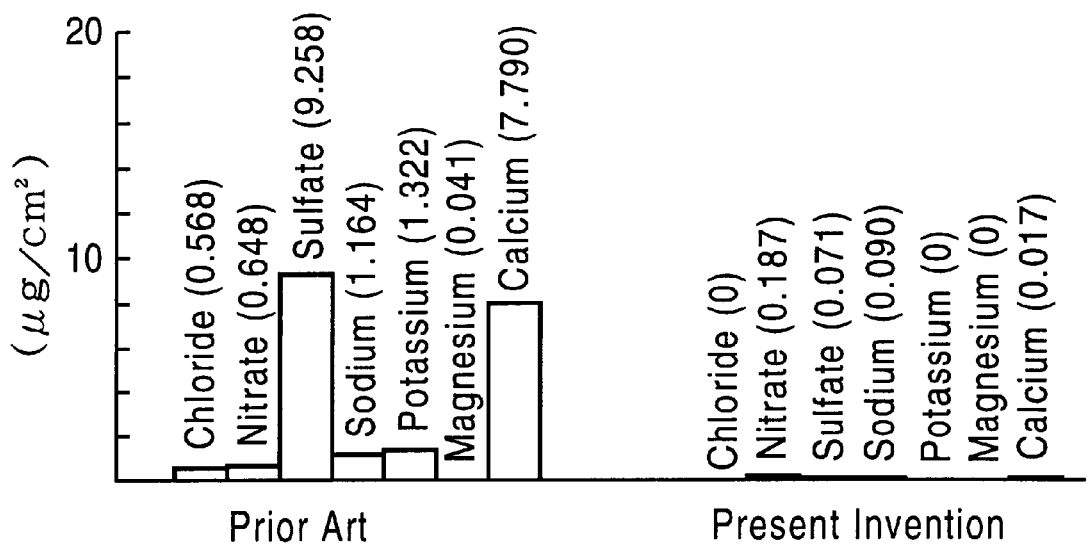
FIG. 4(a) is a graph indicating degree of cleanness in ion residues of a base of the rotary medium driving motor shown in FIG. 3 compared with that of the current construction motor.

FIG. 4(a) is a graph indicating degree of cleanness in ion residues of a base of the rotary medium driving motor shown in FIG. 3 compared with that of the current construction motor.

Figure 4B:
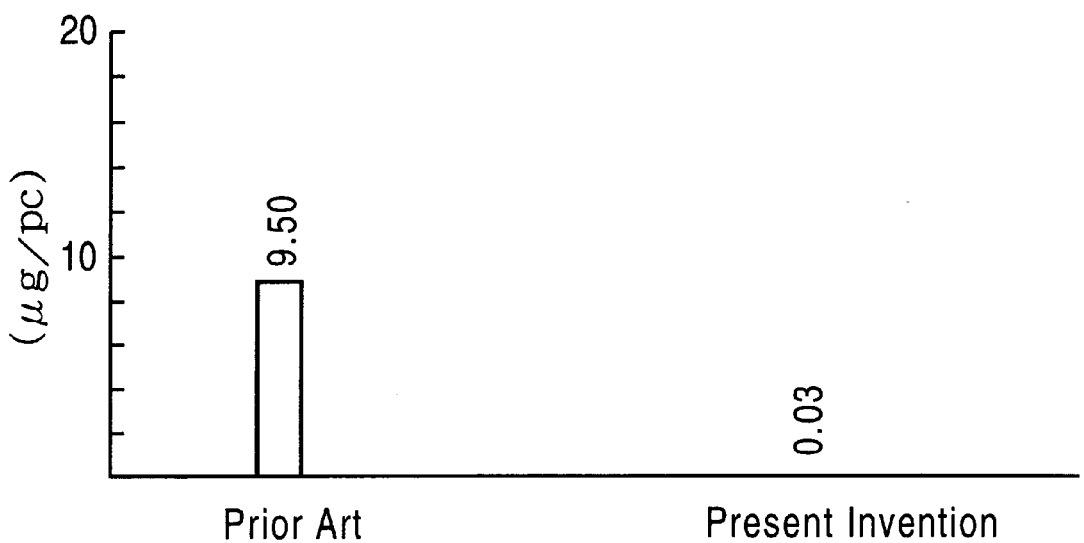
FIG. 4(b) is a graph indicating degree of cleanness in out gas amount of the base of the rotary medium driving motor shown in FIG. 3 compared with that of the current construction motor.

FIG. 4(b) is a graph indicating degree of cleanness in out gas amount of the base of the rotary medium driving motor shown in FIG. 3 compared with that of the current construction motor.

Figure 5:
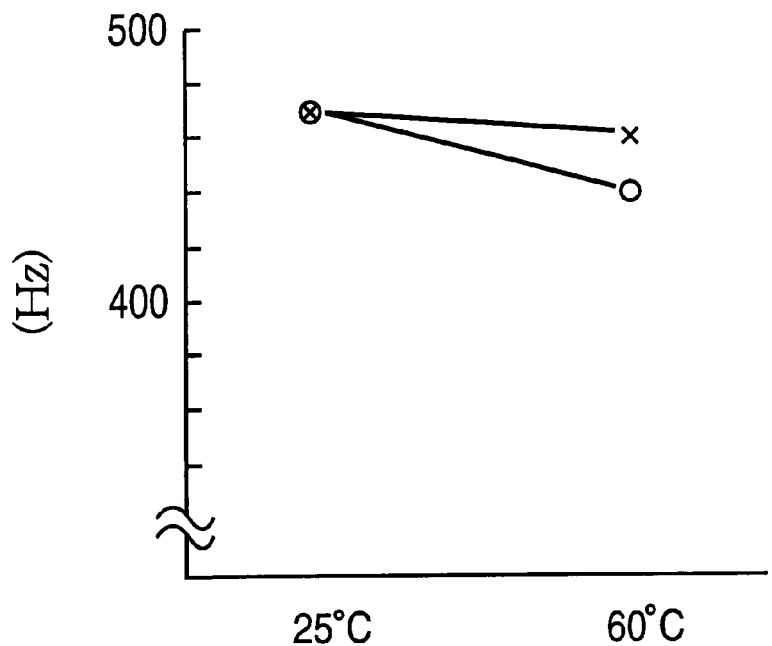
FIG. 5 is a graph indicating a temperature characteristic of resonant frequency of the rotary medium driving motor shown in FIG. 3 compared with that of the current construction motor.

FIG. 5 is a graph indicating a temperature characteristic of resonant frequency of the rotary medium driving motor shown in FIG. 3 compared with that of the current construction motor.

Figure 6:
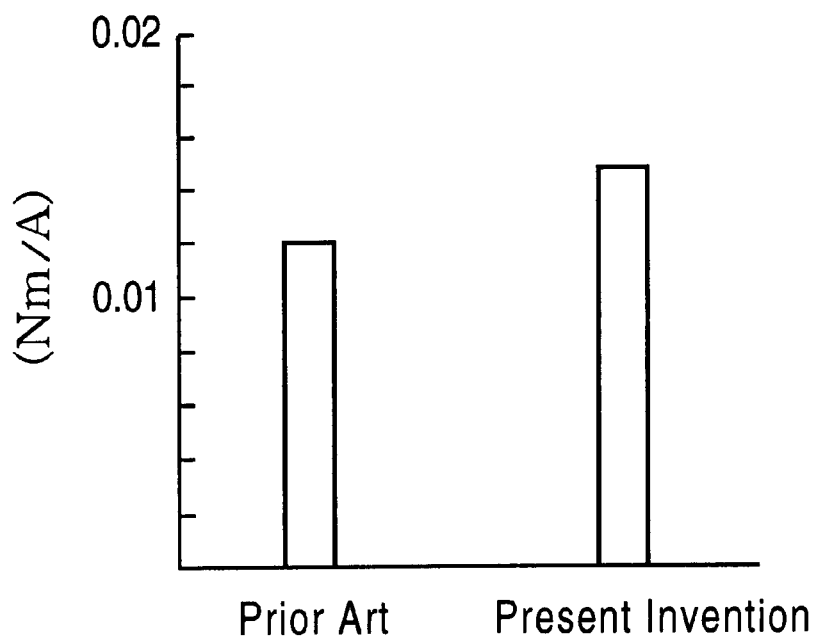
FIG. 6 is a graph indicating a torque constant of the rotary medium driving motor shown in FIG. 3 compared with that of the current construction motor.

FIG. 6 is a graph indicating a torque constant of the rotary medium driving motor shown in FIG. 3 compared with that of the current construction motor.

In FIG. 3, a rotary medium driving apparatus 201 comprises a stator section 204 and a rotor section 203, which is allocated with rotating freely around the stator section 204. The stator section 204 comprises a motor base (base) 202, which fixes a shaft 218, a stator core 215 being allocated nearby a center of the base 202, a driving coil 214, and a printed circuit board 208. The base 202 is formed in one piece from rolled steel by a presswork and is nickel-plated, for example, on a surface to prevent rusting. Further, the base 202 can also be formed from aluminum plate so as to eliminate rustproofing or not so as to provide a rustproof treatment layer. The stator core 215 is provided with a plurality of projected poles (not shown) and the driving coil 214 is wound around each projected pole.

The rotor section 203 comprises a hub 211, a magnet 212, a rotor yoke 213, and a cap 206. The hub 211 is allocated around the shaft 218 by means of upper and lower ball bearings 216 and 217, so that the rotor section 203 can rotate freely around the shaft 218 by means of the upper and lower ball bearings 216 and 217. The hub 211 is provided with a cylindrical section 211a and a flange section 211b to support and fasten a magnetic disk (not shown).

A top of the hub 211, which is allocated in an opposite end to the stator section 204 above the upper ball bearings 216, is sealed up by the cap 206. The rotor yoke 213 and the magnet 212 in a cylindrical shape are fixed underneath the flange section 211b of the hub 211.

The projected poles of the stator core 215 face toward the magnet 212 provided on the hub 211 in a radial direction with keeping a predetermined gap between them.

Accordingly, rotation of the hub 211 can be controlled in response to a rotary magnetic field produced by the driving coil 214 wound around the stator core 215 by controlling a power supply to the driving coil 214 to switch.

In addition thereto, the printed circuit board 208 is provided on the rotary medium driving apparatus 201 so as to connect the driving coil 214 to an external driver circuit (not shown).

As mentioned above, the base 202 of the rotary medium driving apparatus 201 is formed from rolled steel or aluminum plate by a presswork and is different from that of the driving apparatus of the prior art formed by an aluminum die casting method, so that no porous appears on the base 202.

Figure 7:
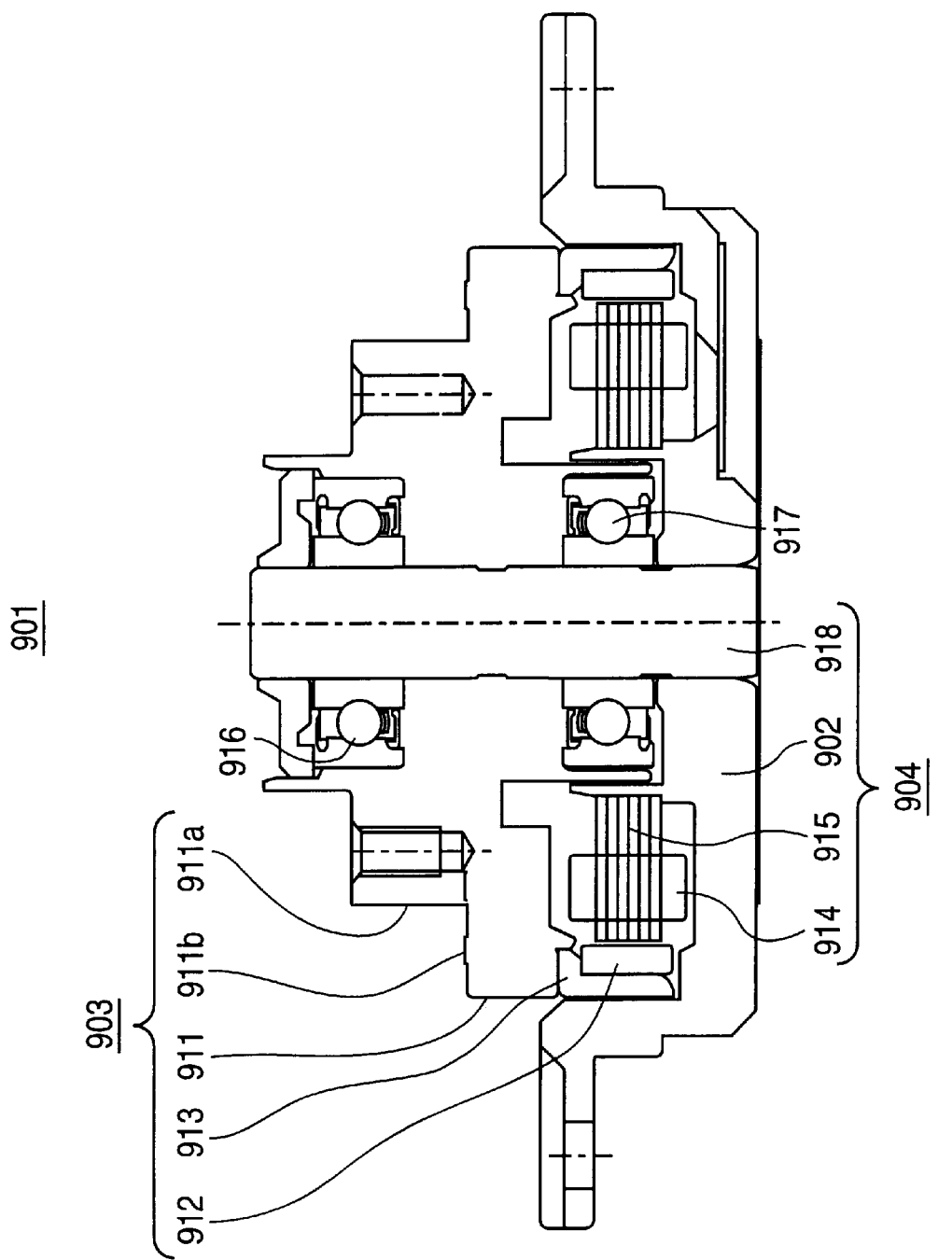
FIG. 7 is a cross sectional view of a magnetic disk driving apparatus according to the prior art.

Accordingly, the rotary medium driving apparatus 201 can eliminate following problems occurring in the rotary medium driving apparatus of the prior art such as shown in FIG. 7.

With referring back to FIG. 7, the housing (base) 902 is formed by the aluminum die casting method, therefore, gas generated while die casting process remains inside the material of the base 902 and small cavities or porous are apt to be generated inside the aluminum casting easily.

Further, the base 902 is required to be finished by the machinery cuts after casting, so that cutting oil utilized while the machinery cuts process and cleaning liquid utilized for cleaning the cutting oil may remain in the small cavities existing inside the aluminum casting of the base 902 as a residue. The gas remained in the porous while die casting process and residues such as cutting oil and cleaning liquid remaining inside the small cavities gradually outgas or leak out from the base 902 as temperature of inside a HDD (not shown) rises and as the time proceeds after the magnetic disk driving apparatus 901 has been installed in the HDD. A surface of a magnetic disk (not shown) loaded on the hub 911 is corroded by the outgassing vapor. Accordingly, a base formed by the aluminum die casting method causes a reliability problem.

On the other hand, the base 202 of the rotary medium driving apparatus 201 is formed from rolled steel or aluminum plate by the presswork, so that no small cavity or porous is generated. Further, the machinery cuts is not applied to the base 202, so that little outgas is emitted from the base 202 and a surface of a magnetic disk is not corroded. Accordingly, reliability of a HDD installing the rotary medium driving apparatus 201 can be increased.

With referring to FIGS. 4(a) and 4(b), a result of measuring degree of cleanness of the base 202 of the rotary medium driving apparatus 201 in comparison with that of the base 902 of the rotary medium driving apparatus 901 of the prior art is depicted next.

FIG. 4(a) is a graph of showing an amount of each element obtained by extracting ion residues, which are contained in the base 202 or the housing 902 itself before installed into the rotary medium driving apparatus 201 or the magnetic disk driving apparatus 901, with pure water. In FIG. 4(a), an amount of each element is indicated on a vertical axis in a unit of $\mu g/cm^2$ and a name of each element is exhibited on a horizontal axis with indicating an amount of each element in parentheses. The graph shows two groups of elements such that one group is for the housing 902 (referred as "Prior Art" and the other is for the base 202 (referred as "Present Invention") respectively. As shown in FIG. 4(a), it is apparent that a residue of each element contained in the base 202 of the rotary medium driving apparatus 201 in accordance with the third embodiment (referred as "Present Invention") is further less than that of the base 902 of the magnetic disk driving apparatus 901 in accordance with the prior art (referred as "Prior Art").

FIG. 4(b) is a graph of showing an outgas amount in a surrounding of 85° C. leaked form the base 202 or the housing 902 itself before installed into the rotary medium driving apparatus 201 or the magnetic disk driving apparatus 901. In FIG. 4(b), the outgas amount is indicated on a vertical axis in a unit of $\mu g$ per piece. As shown in FIG. 4(b), it is apparent that an outgas amount of the base 202 of the rotary medium driving apparatus 201 in accordance with the third embodiment (referred as "Present Invention") is further less than that of the housing 902 of the magnetic disk driving apparatus 901 in accordance with the prior art (referred as "Prior Art").

Further, in a case that the base 202 of the rotary medium driving apparatus 201 is made by metal plate of iron family such as rolled steel and formed by a presswork, coefficient of linear expansion of the base 202 is almost a same as that of the shaft 218 made by an iron material such as stainless steel, so that coupling strength between the base 202 and the shaft 218 does not decrease remarkably even in a surrounding of high temperature. Accordingly, a new effect such that a shift amount of resonant frequency of the rotary medium driving apparatus 201 is remarkably small in the surrounding of high temperature is exhibited.

With referring to FIG. 5, a result of measured effect of a smaller shift amount of resonant frequency of the rotary medium driving apparatus 201 in the surrounding of high temperature is depicted next.

FIG. 5 is a graph of showing change of a resonant frequency of the rotary medium driving apparatus 201 composed of the base 202 made by metal plate of iron family and formed by a presswork in response to a surrounding temperature (plotted by "X") in comparison with that of the magnetic disk driving apparatus 901 composed of the housing 902 made by aluminum die casting (plotted by "O"). As shown in FIG. 5, it is apparent that the change of resonant frequency of the rotary medium driving apparatus 201 is smaller than that of the magnetic disk driving apparatus 901.

Furthermore, in a case that the base 202 of the rotary medium driving apparatus 201 is made by metal plate such as rolled steel, which is also a kind of magnetic material, and formed by a presswork, and then allocated to an inner circumference area of the stator core 215, so that the base 202 becomes a part of a magnetic circuit. Accordingly, a new effect is exhibited such that driving torque of the rotary medium driving apparatus 201 is increased in comparison with that of the prior art in same dimensions.

With referring to FIG. 6, the effect of increasing driving torque is depicted.

FIG. 6 is a graph of showing a torque constant. In FIG. 6, a torque constant is indicated on a vertical axis in a unit of Nm/A. Two bars represent that one is a torque constant of the magnetic disk driving apparatus 901 of the prior art (referred as "Prior Art") and the other is that of the rotary medium driving apparatus 201 of the third embodiment of the present invention respectively. As shown in FIG. 6, it is apparent that a torque constant of the rotary medium driving apparatus 201 composed of the base 202 made by a magnetic material and formed by a presswork (referred as "Present Invention") is improved in comparison with that of the magnetic disk driving apparatus 901 composed of the housing 902 formed by aluminum die casting in a same dimension (referred as "Prior Art").

As depicted above, a stator of a rotary medium driving apparatus, according to the present invention, is composed of a flat housing or a flat base formed by a presswork, so that no porous or no small cavity is existed in the base of the present invention in comparison with a housing of the prior art finished by a machinery cuts. Further, cutting oil or cleaning liquid is not necessary for the base of the preset invention, so that residues of cutting oil and cleaning liquid never evaporate or the residues never cause problems such that a head sticks on a magnetic disk, the head is crushed, and data is accidentally erased due to evaporated residues. Accordingly, a rotary medium driving apparatus in extremely high reliability can be provided.

Further, porous or a small cavity, which is contained in an aluminum die cast housing of the prior art, is never generated in a base formed by a presswork. Accordingly, the above-mentioned effect is surely exhibited.

Furthermore, the rotary medium driving apparatus can be manufactured with maintaining a concentric degree between a stator core and a shaft in high accuracy by means of maintaining a concentric degree of the outer and inner circumference surfaces of a ring shaped projection of the base in high accuracy by producing a die for press-working the base in high accuracy. Accordingly, performance and productivity of the rotary medium driving apparatus can be improved and a cost of the driving apparatus can be reduced.

Moreover, since a base is formed by a presswork, an iron family material and a magnetic material can be utilized for the base. In a case of utilizing an iron family material for the base, coefficient of linear expansion of the base is almost a same as that of a shaft, if the shaft is made by a same iron family material such as stainless steel. Accordingly, change of resonant frequency of the driving apparatus in response to change of temperature can be reduced. In a case of utilizing a magnetic material, a magnetic circuit including the base can be constituted, so that driving torque of the driving apparatus can be increased.

In addition thereto, by forming a rustproof treatment layer on the surface of the base made by a presswork, the base is hard to get rusty under various environmental conditions. Accordingly, reliability of the rotary medium driving apparatus or a magnetic disk drive such as a HDD installing the rotary medium driving apparatus can be improved furthermore.

While the invention has been described above with reference to specific embodiment thereof, it is apparent that many changes, modifications, and variations in the arrangement of equipment and devices can be made without departing from the invention concept disclosed herein. For example, the above-mentioned embodiments explain about a magnetic disk drive such as a HDD, which drives a magnetic disk. However, the present invention can be applied to other driving apparatus, which drives any rotary recording medium such as a magneto-optical recording disk other than a magnetic disk.

Fourth Embodiment

Figure 8:
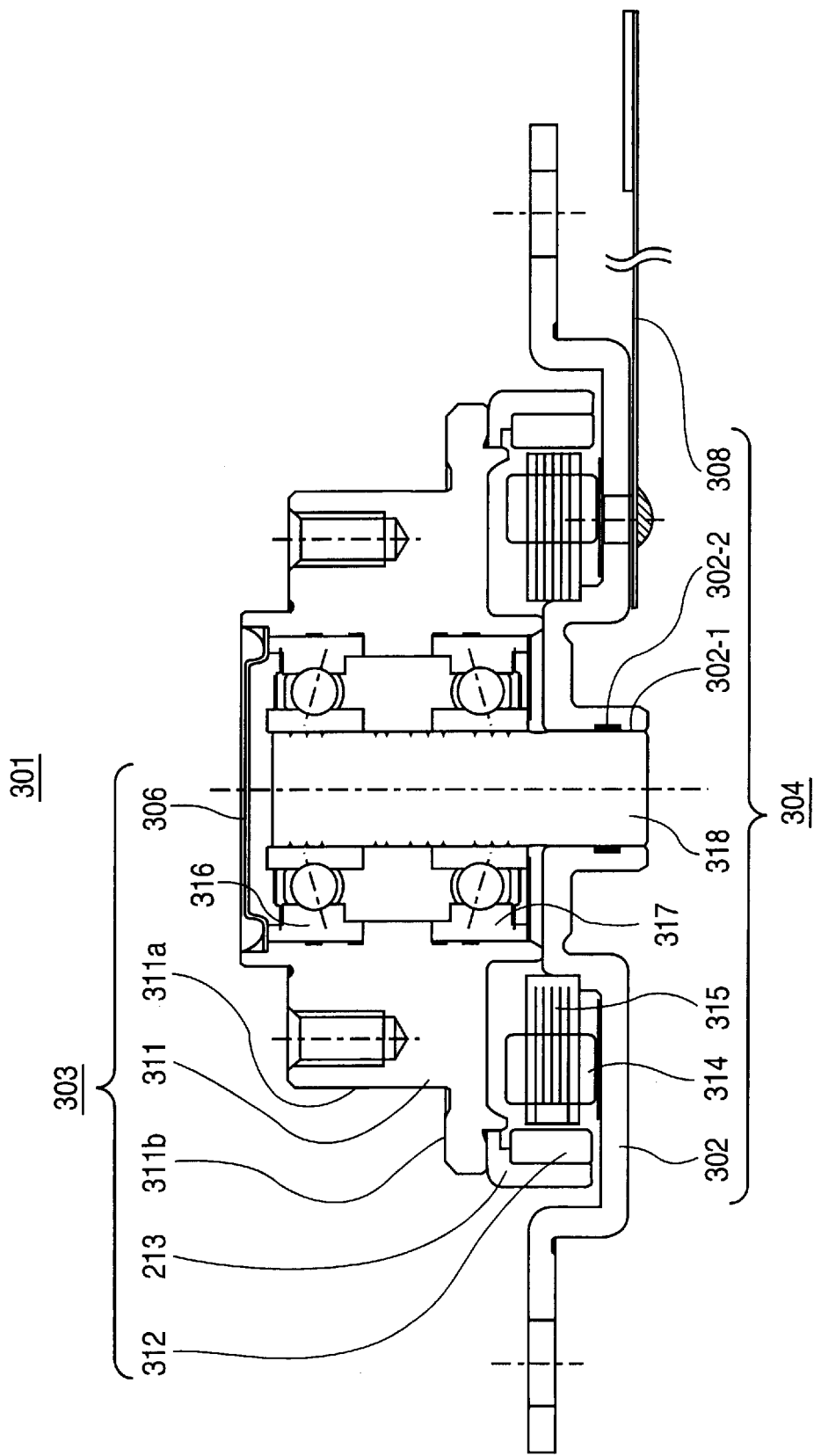
FIG. 8 is a cross sectional view of a rotary medium driving apparatus according to a fourth embodiment of the present invention.

FIG. 8 is a cross sectional view of a rotary medium driving apparatus according to a fourth embodiment of the present invention.

Figure 9:
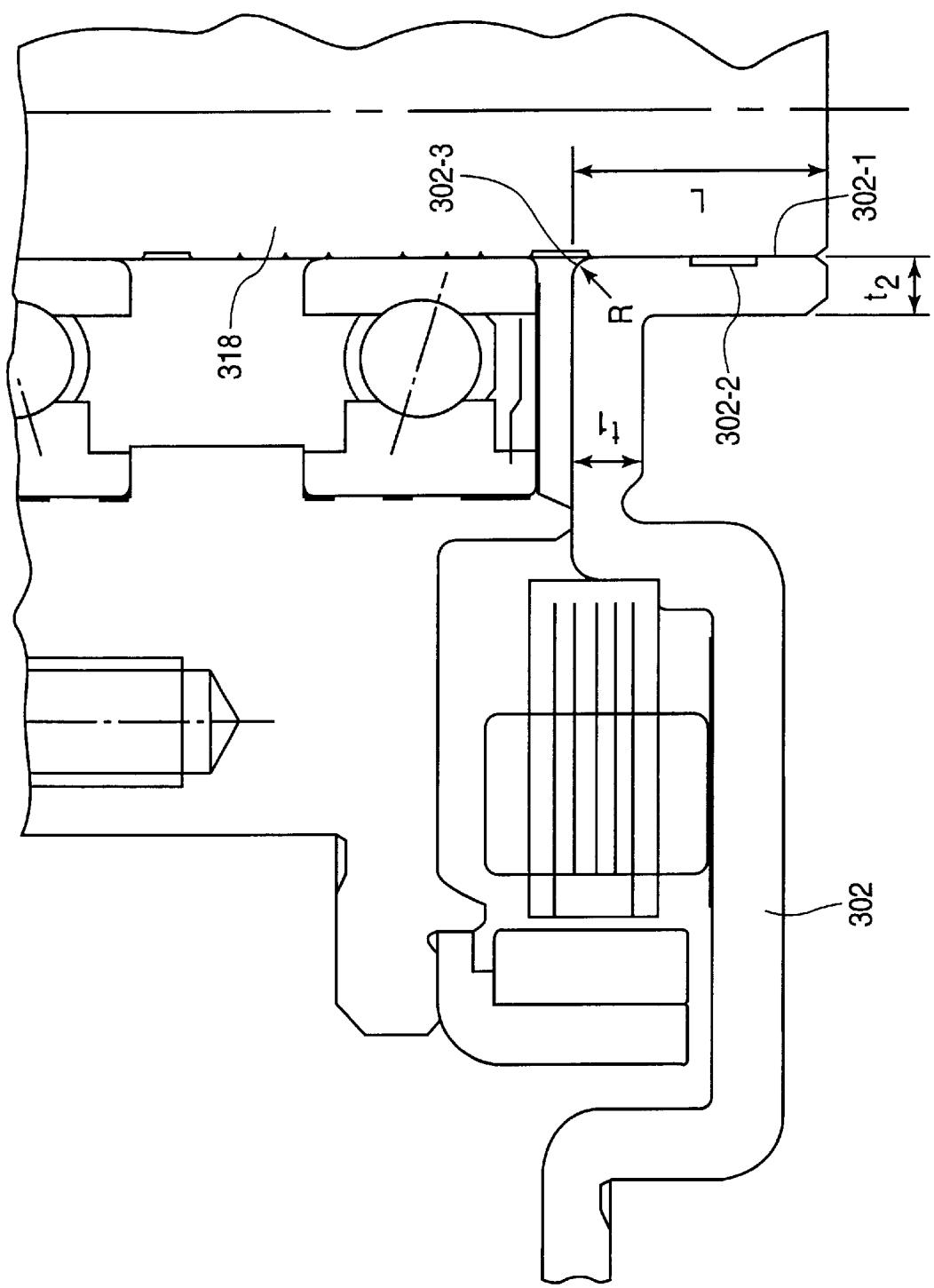
FIG. 9 is a partially enlarged view of the rotary medium driving apparatus shown in FIG. 8.

FIG. 9 is a partially enlarged view of the rotary medium driving apparatus shown in FIG. 8.

Figure 10:
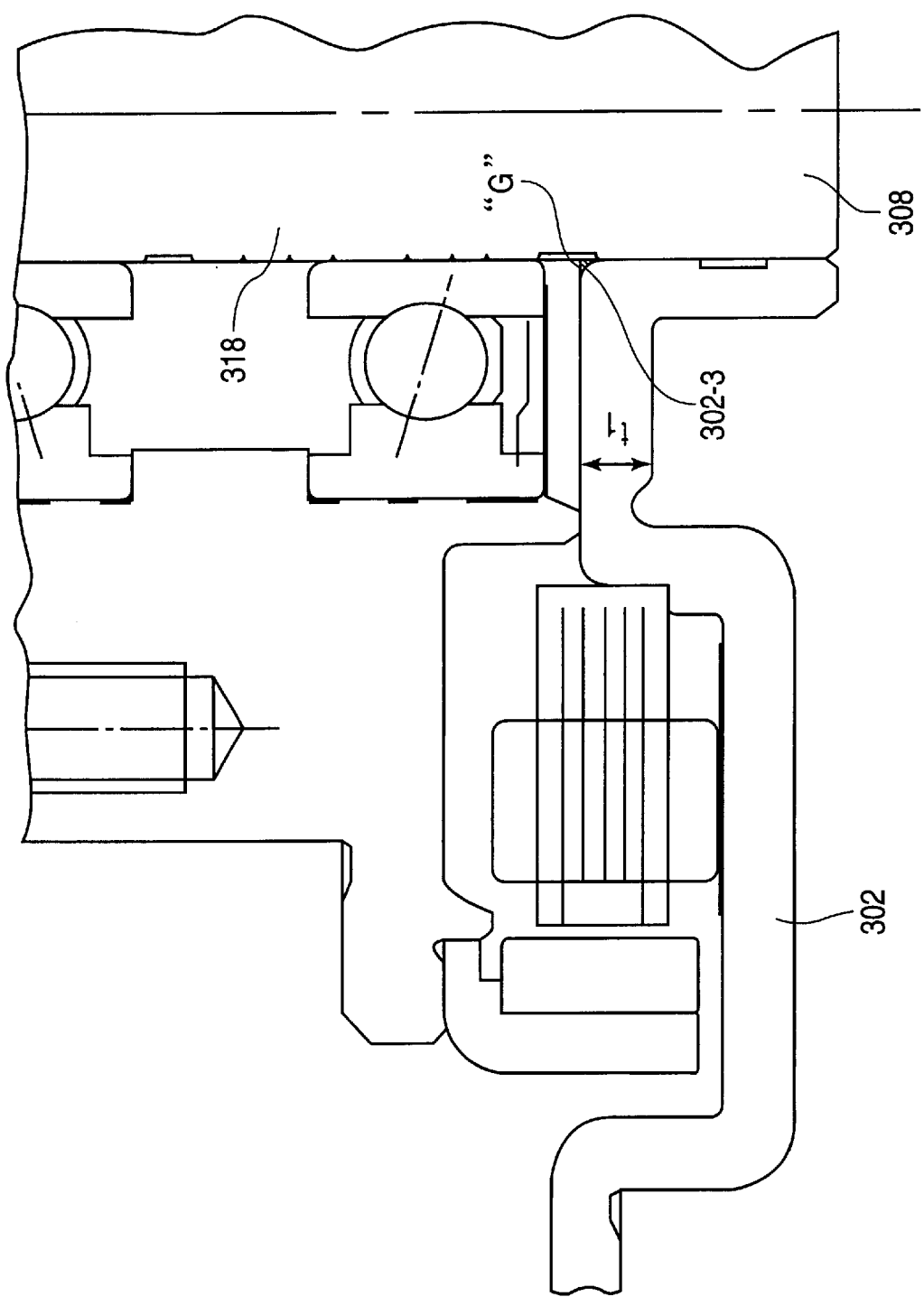
FIG. 10 is a partially enlarged view of the rotary medium driving apparatus shown in FIG. 8.

FIG. 10 is a partially enlarged view of the rotary medium driving apparatus shown in FIG. 8.

Figure 11:
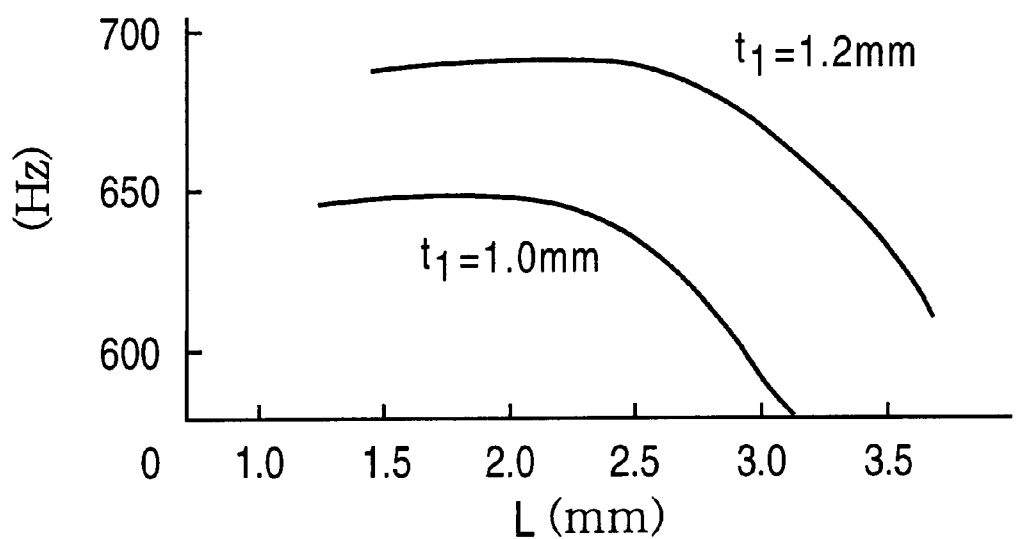
FIG. 11 is a graph indicating a change of resonant frequency of the rotary medium driving apparatus shown in FIG. 8.

FIG. 11 is a graph indicating a change of resonant frequency of the rotary medium driving apparatus shown in FIG. 8.

Figure 12:
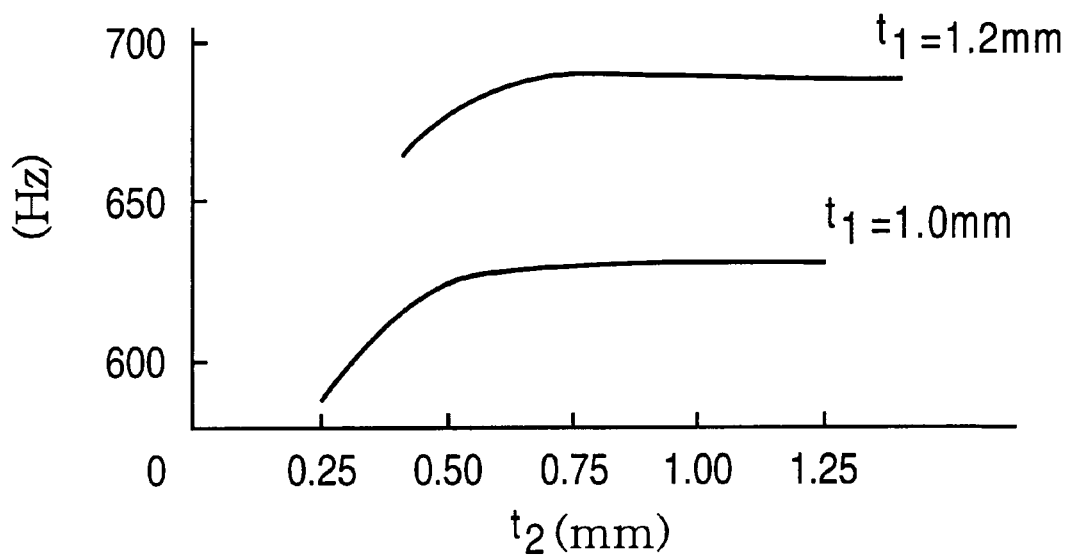
FIG. 12 is a graph indicating a change of resonant frequency of the rotary medium driving apparatus shown in FIG. 8.

FIG. 12 is a graph indicating a change of resonant frequency of the rotary medium driving apparatus shown in FIG. 8.

Figure 13:
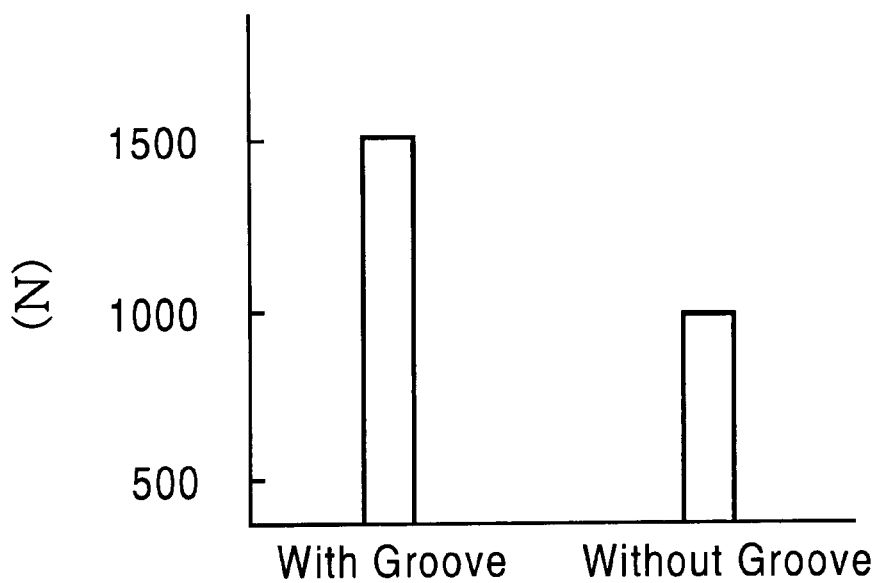
FIG. 13 is a graph indicating an adhesive strength between a shaft and a base of the rotary medium driving apparatus shown in FIG. 8.

FIG. 13 is a graph indicating an adhesive strength between a shaft and a base of the rotary medium driving apparatus shown in FIG. 8.

In FIG. 8, a rotary medium driving apparatus 301 comprises a stator section 304 and a rotor section 303, which is allocated with rotating freely around the stator section 304. The stator section 304 comprises a motor base (base) 302, which fixes a shaft 318, a stator core 315 being allocated nearby a center of the base 302, a driving coil 314, and a printed circuit board 308. The base 302 is formed in one piece from rolled steel by a presswork and nickel plated on a surface to prevent rusting. The stator core 315 is provided with a plurality of projected poles (not shown) and the driving coil 314 is wound around each projected pole.

The rotor section 303 comprises a hub 311, a magnet 312, a rotor yoke 313, and a cap 306. The hub 311 is allocated around the shaft 318 by means of upper and lower ball bearings 316 and 317, so that the rotor section 303 is held by the stator 304 with rotating freely around the shaft 318 by means of the upper and lower ball bearing 316 and 317. The hub 311 is provided with a cylindrical section 311a and a flange section 311b to support and fasten a magnetic disk (not shown).

A top of the hub 311, which is allocated in an opposite end to the stator section 304 above the upper ball bearings 316, is sealed up by the cap 306. The rotor yoke 313 and the magnet 312 in cylindrical shape are fixed underneath the flange section 311b of the hub 311. The projected poles of the stator core 315 face toward the magnet 312 provided on the hub 311 in a radial direction with keeping a predetermined gap between them.

Accordingly, rotation of the hub 311 can be controlled in response to a rotary magnetic field produced by the driving coil 314 wound around the stator core 315 by controlling a power supply to the driving coil 314 to switch.

In addition thereto, the printed circuit board 308 is provided on the rotary medium driving apparatus 301 so as to connect the driving coil 314 to an external driver circuit (not shown).

As shown in FIGS. 8 and 9, there provided a key-way like ring shaped groove 302-2 having a width of 0.1 to 2 mm and a depth of 0.01 to 0.1 mm approximately in a fitting section 302-1 of the base 302. The fitting section 302-1 is a surface of an innermost circumference area of the base 302 and the shaft 318 is pressed in the fitting section 302-1. The key-way like ring shaped groove 302-2 functions as a reservoir for glue when the shaft 318 is fixed to the base 302.

Further, as shown in FIG. 9, an edge 302-3 formed by a top surface of the base 302 and the fitting section 302-1 is rounded by "R" in a radius of 0.3 to 1.5 mm. A space between the rounded edge 302-3 and the shaft 318 is also utilized for a reservoir for glue "G" shown in FIG. 10 when fixing the shaft 318 to the base 302.

Furthermore, as shown in FIG. 9, a thickness $t_2$ of the fitting section 302-1 is formed by a burring process, which is a processing method of forming a cylindrical shape by a rolling process, so as to be thinner than an original thickness $t_1$ of a sheet metal material. A relationship among the thickness $t_1$ and $t_2$ and a burring length "L" is as follows:

$$0.5t_1 \leq t_2 \text{ or } L \leq 2t_1 \qquad \text{(Formula 1)}$$

A resonant frequency, which is defined in corresponding to mechanical stiffness of the rotary medium driving apparatus 301, can be set to an optimum value with satisfying the Formula 1 above. Details of the resonant frequency are explained with referring to FIGS. 11 and 12.

FIGS. 11 and 12 are graphs indicating a change of resonant frequency of the rotary medium driving apparatus shown in FIG. 8.

Prior to explaining FIGS. 11 and 12 in details, signification and necessity of setting a resonant frequency within a limited range in a rotary medium driving apparatus such as a magnetic disk drive is depicted first. A magnetic disk drive has an inherent resonant frequency, which is decided by mechanical dimensions, characteristics of material, and a construction of each component part assembled, as same as other mechanical constructions than a magnetic disk drive.

A resonant frequency is a frequency of vibration when a resonance occurs in a mechanical construction with applying an external vibration to the mechanical construction. It is also called a resonance point.

In a case that the resonant frequency varies by each magnetic disk drive, following problems may occur.

A first problem caused by dispersion of resonant frequencies is that an error may occur when writing information into or reading out information from a magnetic disk due to a vibration, which happens whenever a resonant frequency coincides with a vibration frequency inherent to each moving component included in a magnetic disk drive. A moving component included in a magnetic disk, for example, ball bearings have an inherent number of vibrations or an inherent vibration frequency decided by a rotating frequency of the ball bearings. If a number of vibrations of the ball bearings coincides with a resonant frequency of a magnetic disk drive, a large vibration occurs due to a resonance when the magnetic disk drive is operated and data error may happen.

Further, a second problem caused by dispersion of resonant frequencies is such that a vibration is amplified and a magnetic disk drive may be broken if a resonant frequency coincides with an external vibration applied to the magnetic disk drive. An application of a hard disk drive (HDD), for example, equipped with a magnetic disk drive is expanding to be not only utilized stationary in a house but also installed in a mobile apparatus of being capable of carrying or installed in an equipment for an automobile.

Accordingly, a magnetic disk drive is required to satisfy a reliability performance against vibration so as to maintain function and performance without being destroyed even though an external vibration having a specific range of frequencies is applied to the magnetic disk drive.

As for a condition for vibration frequency, particularly required for a reliability performance against vibration, it is generally decided as a wide frequency rage allocated in a lower frequency side than the specific frequency range.

With respect to two problems mentioned above, a magnetic disk driving apparatus of the prior art is constructed such that a resonant frequency varies by each driving apparatus. Particularly, in a case that dispersion of resonant frequencies is shifted to a lower frequency, a resonance phenomenon caused by an inherent vibration frequency of ball bearings and an external vibration applied to the driving apparatus occurs. Accordingly data error may happen or the driving apparatus may be destroyed.

In order to solve the above-mentioned problems, a magnetic disk drive in this fourth embodiment is constituted so as to reduce dispersion of resonant frequencies varied by each magnetic disk driver. Particularly, by increasing a mechanical stiffness of the magnetic disk drive eliminates dispersion shifting to a lower frequency so as for a resonant frequency to exceed a predetermined value.

FIG. 11 is a characteristic graph indicating a change of resonant frequency of the rotary medium driving apparatus 301 when a burring length "L", which is a fixing length of the base 302 with the shaft 318 in a axial direction, is changed while the driving apparatus 301 drives a magnetic disk with referring to the original thickness $t_1$ of the sheet metal material utilized for the base 302 as a parameter. In FIG. 11, the resonant frequency is indicated on a vertical axis in a unit of Hz and the burring length "L" is indicated on a horizontal axis in a unit of mm. Two curves represent that the original thickness $t_1$ of the sheet metal material of the base 302 is 1.0 mm and 1.2 mm respectively.

It is apparent from FIG. 11 that a resonant frequency is saturated and stable in an area specified by a following Formula 2.

$$L \leq 2t_1 \qquad \text{(Formula 2)}$$

In other words, a resonant frequency of the driving apparatus 301 in a low frequency range is reduced.

By stabilizing a resonant frequency in a higher frequency range as mentioned above, a resonant frequency of the rotary medium driving apparatus 301 can be decided to a value being apart from an inherent vibration frequency to a constitution such as the ball bearings 316 and 317 included in the rotary medium driving apparatus 301. The rotary medium driving apparatus 301 can be prevented from unnecessary and harmful resonance when driving a magnetic disk. Accordingly, the rotary medium driving apparatus 301 can be prevented from not only error when recording data on a magnetic disk or reading out data from the magnetic disk but also possible damage to the rotary medium driving apparatus 301, because a resonant phenomena does not happen even though a certain vibration frequency, which is supposed to be added to the rotary medium driving apparatus 301 externally, is applied.

FIG. 12 is a characteristic graph indicating a change of resonant frequency of the rotary medium driving apparatus 301 when the thickness $t_2$ of the fitting section 302-1 or a burring thickness $t_2$ shown in FIG. 9, which is formed thinner than that of the original thickness $t_1$ of the sheet metal material utilized for the base 302 by a burring process, is changed while the driving apparatus 301 drives a magnetic disk with referring to the original thickness $t_1$ of the sheet metal material utilized for the base 302 as a parameter. In FIG. 12, the resonant frequency is indicated on a vertical axis in a unit of Hz and the burring thickness $t_2$ is indicated on a horizontal axis in a unit of mm. Two curves represent that the original thickness $t_1$ of sheet metal material of the base 302 is 1.0 mm and 1.2 mm respectively.

It is apparent from FIG. 12 that a resonant frequency is saturated and stable in an area specified by a following Formula 3.

$$0.5t_1 \leq t_2 \qquad \text{(Formula 3)}$$

In other words, a resonant frequency of the driving apparatus 301 in a low frequency range is reduced.

As same as mentioned above, by stabilizing a resonant frequency in a higher frequency range, a resonant frequency of the rotary medium driving apparatus 301 can be decided to a value being apart from an inherent vibration frequency to the constitution such as the ball bearings 316 and 317 included in the rotary medium driving apparatus 301. The rotary medium driving apparatus 301 can be prevented from unnecessary and harmful resonance when driving a magnetic disk. Accordingly, the rotary medium driving apparatus 301 can be prevented from not only error when recording data on a magnetic disk or reading out data from the magnetic disk but also possible damage to the rotary medium driving apparatus 301, because a resonant phenomena does not happen even though a certain vibration frequency, which is supposed to be added to the rotary medium driving apparatus 301 externally, is applied.

Further, the above-mentioned effects are multiplied by constituting the base 302 such as $$0.5t_1 \leq t_2 \text{ and } L \leq 2t_1 \qquad \text{(Formula 4)}.$$

Accordingly, the rotary medium driving apparatus 301 can be surely prevented from unnecessary and harmful resonance when driving a magnetic disk and prevented from error when recording data on a magnetic disk or reading out data from the magnetic disk.

Furthermore, in a case that the base 302 is constituted such as satisfying either the Formula 2 or Formula 3, the above-mentioned effects can also be exhibited as being apparent from the above-mentioned explanation and the characteristics shown in FIGS. 11 and 12.

Moreover, in the case of the magnetic disk driving apparatus 901 of the prior art, the housing 902, which is equivalent to the base 302 of the fourth embodiment of the present invention, is formed by the aluminum die casting method. Accordingly, it is possible to optimize a resonant frequency of the magnetic disk driving apparatus 901 with altering dimensions and shape of a specific portion of the housing 902 by machinery cuts. However, in the case of the rotary medium driving apparatuses 1, 101 and 201 of the first through third embodiment of the present invention, the bases 2, 102 and 202 are formed from a flat metal plate by a presswork, so that there existed another problem such that it is hard to optimize a resonant frequency. The rotary medium driving apparatus 301 of the present invention can easily optimize a resonant frequency.

In addition thereto, according to the fourth embodiment of the present invention, the key-way like ring shaped groove 302-2 having a width of 0.1 to 2 mm and a depth of 0.01 to 0.1 mm approximately is provided on the inner circumference surface of the fitting section 302-1 of the base 302, so that the groove 302-2 can be filled up with glue and a fitting strength between the base 302 and the shaft 318 can be increased thereby. Accordingly, mechanical stiffness of the rotary medium driving apparatus 301 is improved.

FIG. 13 is a graph exhibiting the fitting strength between the shaft 318 and the base 302 improved as mentioned above. In FIG. 13, the fitting strength is indicated on a vertical axis in a unit of "N." The graph exhibits two bars: one is for the fitting section 302-1 provided with the key-way like ring shaped groove 302-2 (referred as "With Groove") and the other is without the key-way like ring shaped groove 302-2 (referred as "Without Groove") respectively.

As it is apparent from FIG. 13, the fitting strength of the shaft 318 is improved by providing the key-way like ring shaped groove 302-2 on the fitting section 302-1. A reason that a fitting strength is decreased, in a case that the fitting section 302-1 is not provided with the groove 302-2, is as follows: the inner circumference surface of the fitting section 302-1 is finished by a process such as sizing at a final stage of forming the base 302 by the presswork so as to improve dimensional accuracy of an inner diameter of the fitting section 302-1, so that surface roughness of the inner circumference surface of the fitting section 302-1 is finished in less than 1S. Accordingly, adhesive strength between the shaft 318 and the fitting section 302-1 is deteriorated due to lessened roughness on the surface of the fitting section 302-1.

According to the fourth embodiment of the present invention, the fitting section 302-1 is provided with the key-way like ring shaped groove 302-2, so that fitting strength of the shaft 318 is much improved and mechanical stiffness of the rotary medium driving apparatus 301 is further increased. By increasing mechanical stiffness, a resonant frequency of the rotary medium driving apparatus 301 lowers even in a surrounding of higher temperature or lower temperature. Accordingly, the rotary medium driving apparatus 301 is prevented from data error and damage due to resonance as mentioned above.

With respect to an alternative method of forming the key-way like ring shaped groove 302-2 on the inner circumference surface of the fitting section 302-1, the groove 302-2 can previously be formed on a plate material in a predetermined position, which is allocated so as to be the inner circumference surface of the fitting section 302-1 thereafter, when a flat shape of the base 302 is formed by a presswork. Finally, the key-way like ring shaped groove 302-2 can be automatically formed on the inner circumference surface of the fitting section 302-1 by forming the inner circumference surface of the fitting section 302-1 by means of the burring process.

Fifth Embodiment

Figure 14:
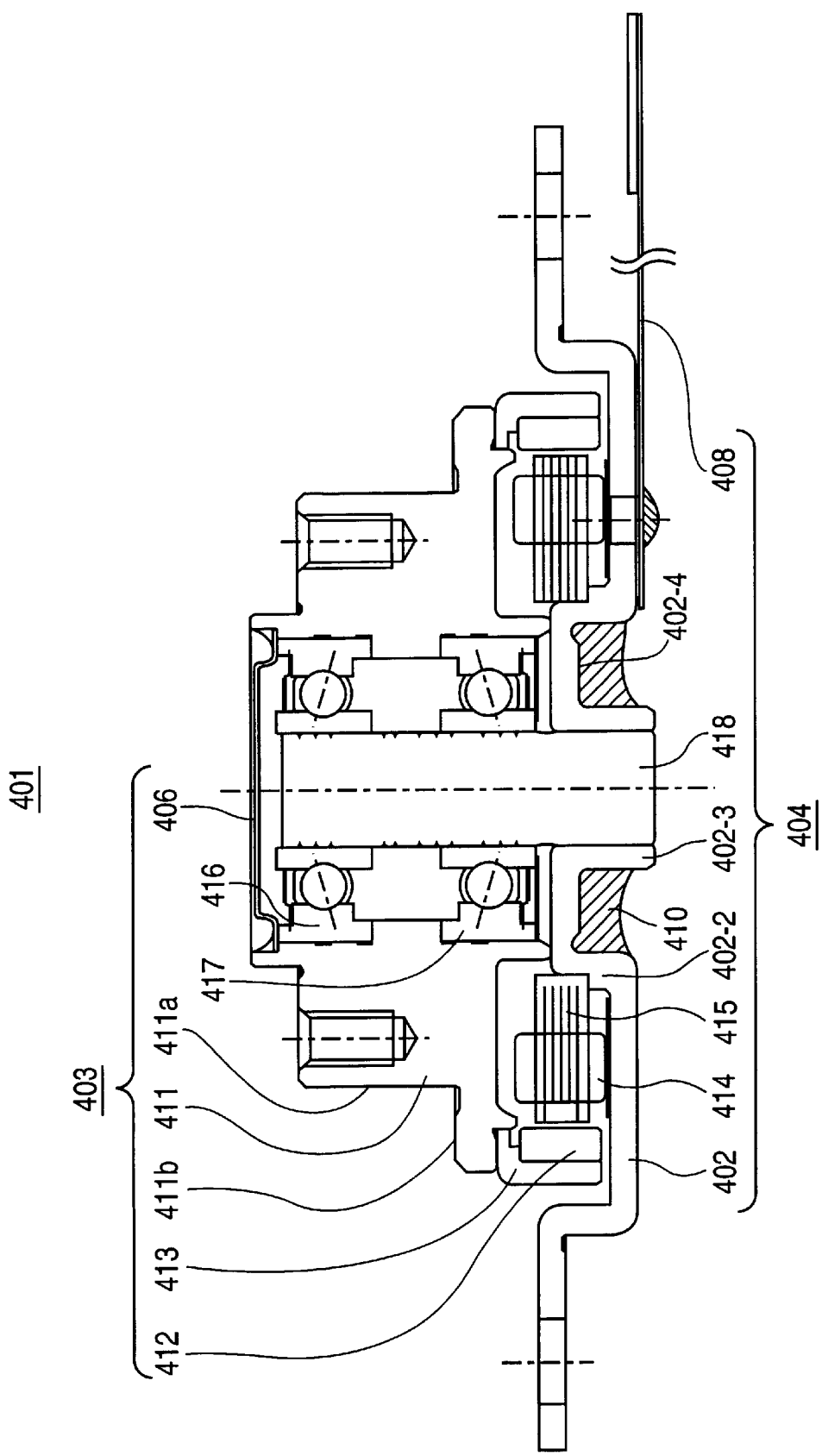
FIG. 14 shows a cross sectional view of a rotary medium driving apparatus according to a fifth embodiment of the present invention.

FIG. 14 shows a cross sectional view of a rotary medium driving apparatus according to a fifth embodiment of the present invention.

Figure 15:
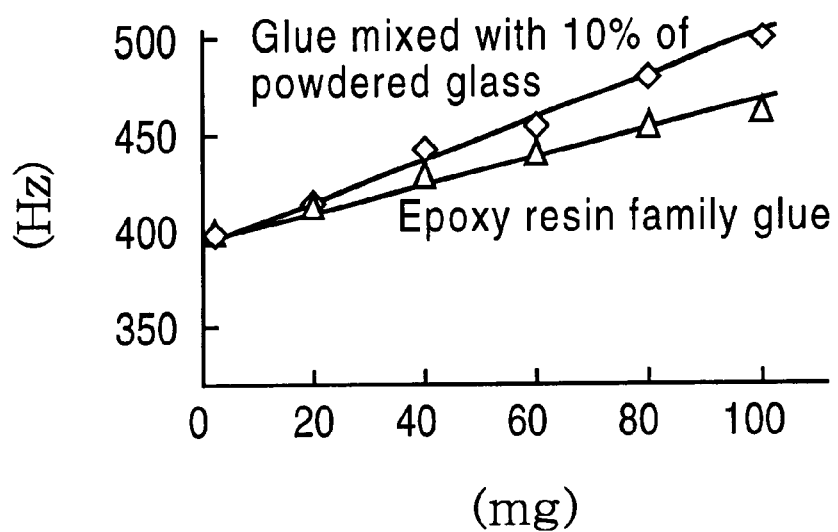
FIG. 15 is a graph indicating a change of resonant frequency of the rotary medium driving apparatus shown in FIG. 14.

FIG. 15 is a graph indicating a change of resonant frequency of the rotary medium driving apparatus shown in FIG. 14.

In FIG. 14, a rotary medium driving apparatus 401 comprises a stator section 404 and a rotor section 403, which is allocated with rotating freely around the stator section 404. The stator section 404 comprises a motor base (base) 402, which fixes a shaft 418, a stator core 415 being allocated nearby a center of the base 402, a driving coil 414, and a printed circuit board 408. The base 402 is formed in one piece from rolled steel by a presswork and nickel plated on a surface to prevent rusting. The base 402 is also preferable to be formed in one piece from aluminum plate so as to eliminate plating to prevent rusting.

The stator core 415 is provided with a plurality of projected poles (not shown) and the driving coil 414 is wound around each projected pole.

The rotor section 403 comprises a hub 411, a magnet 412, a rotor yoke 413, and a cap 406. The hub 411 is allocated around the shaft 418 by means of upper and lower ball bearings 416 and 417, so that the rotor section 403 is held by the stator 404 with rotating freely around the shaft 418 be means of the upper and lower ball bearings 416 and 417.

The hub 411 is provided with a cylindrical section 411a and a flange section 411b to support and fasten a magnetic disk (not shown).

A top of the hub 411, which is allocated in an opposite end to the stator section 404 above the upper ball bearings 416, is sealed up by the cap 406.

The rotor yoke 413 and the magnet 412 in cylindrical shape are fixed underneath the flange section 411b of the hub 411. The projected poles of the stator core 415 face toward the magnet 412 provided on the hub 411 in a radial direction with keeping a predetermined gap between them.

Accordingly, in the rotary medium driving apparatus 401 in accordance with the fifth embodiment of the present invention, rotation of the hub 411, that is, rotation of the rotor 403 can be controlled in response to a rotary magnetic field produced by the driving coil 414 wound around the stator core 415 with controlling a power supply to the driving coil 414 to switch.

In addition thereto, the printed circuit board 408 is provided on the rotary medium driving apparatus 401 so as to connect the driving coil 414 to an external driver circuit (not shown).

Before depicting features of the rotary medium driving apparatus 401 of the fourth embodiment of the present invention, problems, particularly, to be solved by the rotary medium driving apparatus 401 are explained first.

Generally, there existed a resonant frequency or a resonance point in a rotary medium driving apparatus and the resonant frequency varies by each driving apparatus. Particularly, in a case that resonant frequencies disperse in a lower frequency range, many problems may happen as mentioned in the fourth embodiment of the present invention above.

Further, since the base 402 is formed in one piece from rolled steel by a presswork, it is afraid that stiffness, that is, a resonant frequency of the rotary medium driving apparatus 401 may be fluctuated by each production batch due to variations of raw material of rolled steel.

Furthermore, the base 402 is formed in one piece from metal plate by a presswork as mentioned above and provided with a ring shaped projection 405 for supporting the stator core 415 and a fitting section 402-1 for holding the shaft 418. Accordingly, a ring shaped groove 402-4 is formed on an opposite side to the rotor 403 behind the ring shaped projection 405 in the base 402.

In the rotary medium driving apparatus 401 according to the fifth embodiment of the present invention, the ring shaped groove 402-4 is filled up with glue 410 of epoxy resin family, for example. Mechanical stiffness of the rotary medium driving apparatus 401 can be controlled by adjusting a filling amount of the glue 410. Accordingly, a resonant frequency of the rotary medium driving apparatus 401 can be adjusted to a desired value.

In other words, the rotary medium driving apparatus 401 in accordance with the fifth embodiment of the present invention is characterized in that a resonant frequency of the rotary medium driving apparatus 401, which is a frequency of vibration being applied to the rotary medium driving apparatus 401 and causing resonance, can be adjusted by filling the ring shaped grove 402-4 of the base 402 with the glue 410 in some weight corresponding to the desired resonant frequency so as for the resonant frequency to be the desired value, and hardening the glue 410.

Further, such glue as the glue 410 is mixed with particles having larger specific gravity than the glue 410 such as powdered glass or metal can be utilized for increasing more stiffness of the rotary medium driving apparatus 401.

Furthermore, since the ring shaped groove 402-4 is provided on an outermost surface directly exposing to an outside of the rotary medium driving apparatus 401, the rotary medium driving apparatus 401 can be prevented from such a problem as data error due to a film, which is caused by gas leaked from the glue 410 coated and deposited on a surface of a magnetic disk loaded into the rotary medium driving apparatus 401.

FIG. 15 is a graph indicating a change of resonant frequency of the rotary medium driving apparatus 401 while varying a weight of the glue 410 filling the ring shaped groove 402-4. In FIG. 15, the resonant frequency is indicated on a vertical axis in a unit of Hz and the weigh of the glue 410 is indicated on a horizontal axis in a unit of mg. The graph exhibits two curves: the one is for the glue 410 without any mixture, indicated as "Epoxy resin family glue" (plotted by "Δ") on the graph, and the other is mixed with 10% of powdered glass (plotted by "◊") respectively.

As it is apparent from FIG. 15, the resonant frequency is shifted to a higher frequency range corresponding to increase of weight of the glue 410, so that a resonant frequency can be adjusted to a desired value. In other words, according to the fifth embodiment of the present invention, resonance of the rotary medium driving apparatus 401 in a lower frequency range is decreased. Further, by mixing the glue 410 with particles having a larger specific gravity, transition of resonant frequency to a higher frequency range is expanded.

According to the fifth embodiment of the present invention, by adjusting and shifting a resonant frequency to a frequency range outside of a problematic frequency range with controlling a filling amount of the glue 410 to the ring shaped groove 402-4 corresponding to each rotary medium driving apparatus 401 or each production batch, the rotary medium driving apparatus 401 can be prevented from such problems as data error and possible damage to the rotary medium driving apparatus 401 caused by resonance even though a resonant frequency of the finally assembled rotary medium driving apparatus 401 disperses due to scattering of thickness of metal plate as raw material.

Further, in a case of a conventional magnetic disk driving apparatus, many bases or housings in various dimensions and shape are manufactured corresponding to various kinds of magnetic disk driving apparatuses such that they can load just one magnetic disk, two magnetic disks or more respectively. However, in a case of the rotary medium driving apparatus 401 according to the fifth embodiment of the present invention, the same base 402 can be utilized for various kinds of rotary medium driving apparatuses by adjusting a filling amount of the glue 410 corresponding to various kinds of rotary medium driving apparatuses. Accordingly, production of the rotary medium driving apparatus 401 can be rationalized and its manufacturing cost can be reduced by standardizing its component parts such as the base 402.

As mentioned above, according to the present invention, a rotary medium driving apparatus utilizes a flat base (housing) formed by a presswork instead of a housing formed by an aluminum die casting method and finished by machinery cuts, so that no porous is generated in the flat housing while forming the flat housing by the presswork. As a matter of fact, cutting oil or cleaning liquid is not necessary for forming the flat housing formed by the presswork. The rotary medium driving apparatus according to the present invention can be prevented from problems such that a head and a magnetic disk absorb evaporated residues of cutting oil and cleaning liquid remaining on an aluminum housing as a conventional rotary medium driving apparatus and the evaporated residues cause head crash and data erasing. Accordingly, the present invention can provide a rotary medium driving apparatus in extremely high reliability.

Further, the housing formed by the presswork is provided with a ring shaped projection section, which is formed by a presswork using a die, so that concentric degree between an outermost and an innermost circumference surfaces of the ring shaped projection section can be maintained in high accuracy and concentric degree between a stator coil and a shaft can also be maintained in high accuracy thereby. Accordingly, irregular rotation of a rotary medium driving apparatus comprising the housing formed by the presswork can surely be reduced.

Furthermore, the housing in accordance with the present invention mentioned above is formed by the presswork with a die, so that productivity and manufacturing cost of the rotary medium driving apparatus can be decreased in comparison with a conventional rotary medium driving apparatus comprising a housing formed by an aluminum die casting method and finished by machinery cuts.

Moreover, a key-way like ring shaped groove is formed on the housing formed by the presswork so as to hold glue for fixing a shaft, so that the shaft is securely fixed. A thickness of the housing is constituted in various dimensions partially, so that resonance of a rotary medium driving apparatus in a lower frequency range is decreased. Accordingly, the rotary medium driving apparatus can be prevented from error while reading and writing data or from possible damage to the rotary medium driving apparatus caused by resonance.

In addition thereto, resonance of a rotary medium driving apparatus in a lower frequency range is reduced by filling a concave section inside of the ring shaped projection section with glue and hardening the glue. Accordingly, the rotary medium driving apparatus can be prevented from error while reading and writing data or from possible damage to the rotary medium driving apparatus caused by resonance, and further, productivity and manufacturing cost of the rotary medium driving apparatus can be decreased remarkably.

What is claimed is:

1. A rotary medium driving apparatus comprising a rotor being able to rotate freely around a shaft fixed to a stator by means of ball bearings and being provided with an outer circumference surface having a diameter being able to engage with a center hole of a rotary medium to be rotated, said rotary medium driving apparatus being further characterized in that said stator comprises a non-porous flat housing and a stator core allocated in a vicinity of center of said flat housing, and said flat housing being affixed to said shaft.

2. The rotary medium driving apparatus in accordance with claim 1, wherein said housing is further characterized in that resonance of said rotary medium driving apparatus in a lower frequency range is decreased by assigning an original thickness of said flat housing except an inner circumference area for fixing said shaft and a thickness of said inner circumference area and a fitting length of said inner circumference area for fixing said shaft in an axial direction to an extent of $0.5t_1 \leq t_2$ and/or $L \leq 2t_1$, where $t_1$ is the original thickness of said flat housing except the inner circumference area for fixing said shaft, $t_2$ is the thickness of said inner circumference area, and L is the fitting length of said inner circumference area for fixing said shaft in an axial direction.

3. A rotary medium driving apparatus comprising a rotor being able to rotate freely around a shaft fixed to a stator by means of ball bearings and being provided with an outer circumference surface having a diameter being able to engage with a center hole of a rotary medium to be rotated, said rotary medium driving apparatus being further characterized in that said stator comprises a flat housing composed of an iron material composition for forming a magnetic circuit and with said flat housing having almost the same coefficient of linear expansion as said shaft and a stator core allocated in a vicinity of center of said flat housing, wherein said flat housing is provided with a ring-shaped projection section projected toward said rotor with said shaft fixed on an inner circumference surface of the ring-shaped projection section with said stator core being allocated on an outer circumference surface of the ring-shaped projection section, and with said ring-shaped projection section forming a part of the magnetic circuit.

4. The rotary medium driving apparatus in accordance with claim 3, wherein said housing is further characterized in that resonance of said rotary medium driving apparatus in a lower frequency range is decreased by assigning an original thickness of said flat housing except an inner circumference area for fixing said shaft and a thickness of said inner circumference area and a fitting length of said inner circumference area for fixing said shaft in an axial direction to an extent of $0.5t_1 \leq t_2$ and/or $L \leq 2t_1$, where $t_1$ is the original thickness of said flat housing except the inner circumference area for fixing said shaft, $t_2$ is the thickness of said inner circumference area, and L is the fitting length of said inner circumference area for fixing said shaft in an axial direction.

5. A rotary medium driving apparatus comprising a rotor being able to rotate freely around a shaft fixed to a stator by means of ball bearings and being provided with an outer circumference surface having a diameter being able to engage with a center hole of a rotary medium to be rotated, said rotary medium driving apparatus being further characterized in that said stator comprises a flat housing and includes a stator core allocated in a vicinity of center of said flat housing, wherein said flat housing is provided with a ring-shaped projection section projected toward said rotor with said shaft fixed on an inner circumference surface of the ring-shaped projection section with said stator core being allocated on an outer circumference surface of the ring-shaped projection section, and with said ring-shaped projection section being provided with a ring-shaped groove containing glue for fixing said shaft, and with said shaft being adhered to said ring-shaped projection section by said glue contained in said ring-shaped groove.

6. The rotary medium driving apparatus in accordance with claim 5, wherein said housing is further characterized in that resonance of said rotary medium driving apparatus in a lower frequency range is decreased by assigning an original thickness of said flat housing except an inner circumference area for fixing said shaft and a thickness of said inner circumference area and a fitting length of said inner circumference area for fixing said shaft in an axial direction to an extent of $0.5t_1 \leq t_2$ and/or $L \leq 2t_1$, where $t_1$ is the original thickness of said flat housing except the inner circumference area for fixing said shaft, $t_2$ is the thickness of said inner circumference area, and L is the fitting length of said inner circumference area for fixing said shaft in an axial direction.

7. A rotary medium driving apparatus comprising a rotor being able to rotate freely around a shaft fixed to a stator by means of ball bearings and being provided with an outer circumference surface having a diameter being able to engage with a center hole of a rotary medium to be rotated, said rotary medium driving apparatus is further characterized in that said stator comprises a flat housing and a stator core allocated in a vicinity of center of said flat housing, and wherein said flat housing is provided with a ring-shaped projection section projected toward said rotor with said shaft fixed on an inner circumference surface of the ring-shaped projection section and with said stator core allocated on an outer circumference surface of the ring shaped projection section, and with said ring-shaped projection section being filled with glue adapted to harden, with the amount of glue in said projection section being sufficient such that the resonance frequency of said rotary medium driving apparatus is at a predetermined value based on the amount of said glue.

8. The rotary medium driving apparatus in accordance with claim 7, wherein said housing is further characterized in that resonance of said rotary medium driving apparatus in a lower frequency range is decreased by assigning an original thickness of said flat housing except an inner circumference area for fixing said shaft and a thickness of said inner circumference area and a fitting length of said inner circumference area for fixing said shaft in an axial direction to an extent of $0.5t_1 \leq t_2$ and/or $L \leq 2t_1$, where $t_1$ is the original thickness of said flat housing except the inner circumference area for fixing said shaft, $t_2$ is the thickness of said inner circumference area, and L is the fitting length of said inner circumference area for fixing said shaft in an axial direction.

* * * * *